Aug. 28, 1951 — J. J. DONOHUE — 2,566,058
TRANSPARENT BIFOCAL PROTRACTOR
Filed Feb. 16, 1948
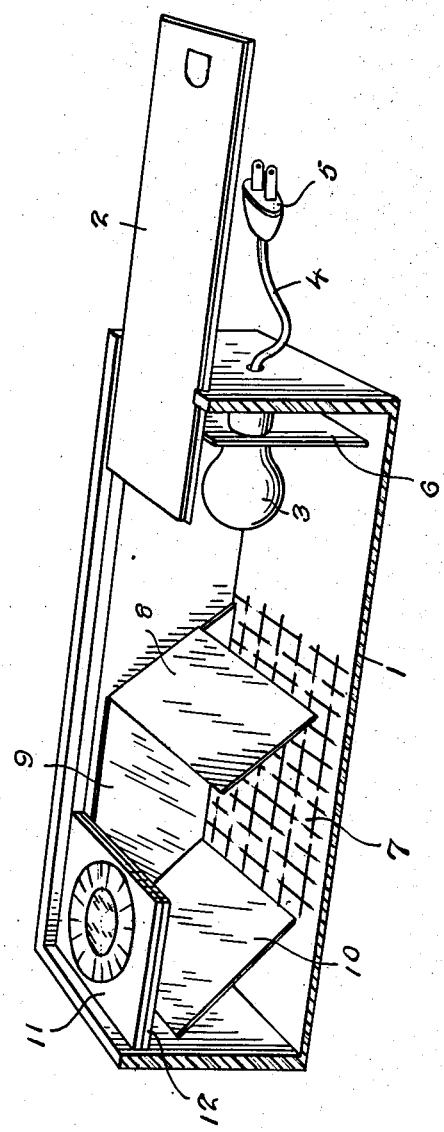
INVENTOR.
John J. Donohue, deceased,
by Elizabeth Donohue, Administatrix
ATTORNEYS Patented Aug. 28, 1951

2,566,058

UNITED STATES PATENT OFFICE 2,566,058

TRANSPARENT BIFOCAL PROTRACTOR

John J. Donohue, deceased, late of Brooklyn, N. Y., by Elizabeth Donohue, administratrix, Brooklyn, N. Y.

Application February 16, 1948, Serial No. 8,555

1 Claim. (Cl. 88—56)

This invention relates in general to optics and optical appliances, and more specifically to an improved transparent bifocal protractor which while well adapted for various purposes and uses is especially designed for directing light rays to and illuminating a protractor for laying out diagrams, locating segments of bifocal lenses, and for testing and checking finished lenses.

As is well known, under existing practice, considerable time and labor are expended on optical instruments equipped with opaque protractors in marking out or outlining uncut bifocal lenses preparatory to cutting and edging, and ink dots are employed for outlining the segment of a bifocal lens.

In carrying out the invention as physically embodied in the analyzing instrument, there is employed for the lens blank a protractor of transparent material and there is utilized a light with reflecting mirrors and polarizing means for illuminating and displaying on the blank the desired outline of the segment, thus eliminating the time and labor required usually expended under existing practice.

The lens blank may thus be laid out with precision and facility for optical centering and axis, and readily marked in accord with a predetermined prescription, for subsequent mounting in a desired frame.

The invention consists in certain novel features of construction and combinations and arrangements of parts in an instrument of this character, as will hereinafter be described in detail, and and more particularly set forth in the appended claim.

In the accompanying drawing there is illustrated a complete example of a physical embodiment of the invention wherein the parts are combined and arranged in accord with one mode which has thus far been devised for the practical application of the principles of the invention, but it will be understood that changes and alterations are contemplated and may be made in this exemplifying drawing and mechanical structures, within the scope of the claim without departing from the principles of the invention.

The figure of the drawing is a perspective view, partly broken away for convenience of illustration, showing an embodiment of the invention, that includes a cabinet, casing, or rectangular box 1 which may be employed as a work table, and is equipped with a slide panel or top cover 2.

A suitable source of light, as an electric bulb 3 is mounted in one end wall of the cabinet, within the cabinet, and provided with an exterior extension cord 4 and plug 5, for making electrical connection with a conventional electrical outlet.

The interior of the cabinet forms a light chamber with an optical axis, or light axis, extending horizontally from the light bulb 3, and a suitable reflector 6, preferably aluminum coated, is mounted on the lighting unit in a vertical plane, for directing light rays through the chamber. For enhancing the lighting effect within the chamber, the inner surfaces of the walls of the chamber are also coated with aluminum, or other reflecting medium; and a spaced zone 7 on the inner surface of the bottom wall of the cabinet also provides a reflecting surface that is preferably laid off or etched in squares to refract or scatter the light rays transmitted by the reflector 6 from the light bulb.

Mounted above and spaced over this light scattering zone 7 a multi-panel reflecting unit is located on the optical axis of the instrument for intercepting, collecting, and directing upwardly the light rays to the support and analyzing device of the instrument. This unit includes an obliquely disposed plain or conventional light diffusing mirror 8 having its lower elevated edge terminating a predetermined distance above the floor of the cabinet, which prevents light rays from the lamp from directly reaching the lens blank; and the unit also includes lateral vertically disposed plain or common mirrors 9 for enhancing the lighting effect of the chamber.

At the end of the cabinet or light chamber opposed to the lamp, and in line with the optical axis an angularly disposed intercepting and light reflecting mirror 10, preferably of blue glass, is mounted, to direct upwardly and diffuse the light rays to the lens blank that is supported near the top of the cabinet and above the mirror 10.

The support for the lens blank includes a fixed horizontally disposed protractor 11 of transparent material, which is backed by a plate 12 of polarized glass, and the support is rigidly mounted in suitable manner for ready access in placing or setting the lens blank in operative position, with the slide or cover 2 covering the interior of the light chamber.

In an analysis of a polarized or Polaroid lens, the lens to be marked is movably set or positioned upon the transparent protractor or chart, and then the lens blank is manually turned or rotated until the maximum volume or amount of reflected light passing through the polarized glass plate 12 and protractor 11 is cut off, after which the horizontal axis of the lens may be determined with clear visibility and marked on the blank.

With the parts arranged in this manner direct rays of light from the light bulb 3 and reflector 6 are prevented from being reflected through the protractor by the mirror 10 and with the casing provided with a lower reflecting surface 7 and side reflecting surfaces 9 the interior of the casing will be full of light and light passing under the mirror 8 will illuminate the area between the mirrors 8 and 10 providing a diffused light through the protractor and polarizing element.

A finished Polaroid lens may also be tested or checked by first marking the lens in a lensometer, or a centering machine, for the axis, and then noting whether or not this axis blocks out the maximum volume or amount of light when placed upon the protractor.

The markings or diagram on the protractor for determining the height of the segment may range from one millimeter up to six millimeters, while the decentering or in and out divisions may be spaced one millimeter apart with three divisions at each side of the vertical line.

The top curve of the segment line of the lens may be employed in laying out various types of bifocals, in order that they may easily be marked, usually with the top curve parallel with the cutting line.

In preferred practice the lens blank is mounted in movable relation on the lens marking support or transparent protractor, which renders visible the multiple lines or parallelograms of the protractor, whereby the optician may with facility and accuracy turn or rotate the lens blank to magnify and clearly display and define the outline of a segment.

The protractor may also be utilized as a support in testing a lens to ascertain whether or not if it has previously been case hardened, by mounting the lens on the protractor which is illuminated from the light chamber, and seeking for the familiar cross line that results when a piece of polarized film, or glass, is held over the case hardened lens.

Having thus fully described the invention what is claimed as new and desired to secure by Letters Patent is:

In a bifocal protractor apparatus, a hollow housing including a bottom wall, a cover slidably arranged in the top of said housing, an electric bulb mounted in one end of said housing and adapted to be connected to a source of electrical energy, a vertically disposed reflector mounted between said bulb and that end of the housing which supports the bulb, the inner surfaces of the walls of the housing being coated with a reflecting medium for increasing the lighting effect in the housing, a portion of the bottom wall of the housing being laid off in squares to scatter the light rays transmitted by the reflector from the light bulb, a first inclined mirror arranged in said housing intermediate the ends thereof for intercepting the light rays from the bulb, the lower edge of said mirror being spaced above the bottom wall of the housing, the upper edge of the mirror extending to the top of the housing, a second mirror arranged in spaced parallel relation with respect to said first mirror and arranged in the opposite end of said housing from said bulb for directing upwardly the diffused light rays, vertically disposed mirrors mounted on the sides of the housing and extending between said first and second mirrors, and a horizontally disposed lens support arranged above said second mirror, said lens support comprising a horizontally disposed protractor fabricated of transparent material, and a horizontally disposed glass plate arranged below said protractor, an end of said cover abutting said lens support when the apparatus is being used.

ELIZABETH DONOHUE,
*Administratrix of Estate of John J. Donohue, Deceased.*

REFERENCES CITED

The following references are of record in the file of this patent:

UNITED STATES PATENTS

| Number | Name | Date |
|---|---|---|
| 1,929,534 | Long | Oct. 10, 1933 |
| 1,977,446 | Long | Oct. 16, 1934 |
| 2,412,074 | Benford | Dec. 3, 1946 |
| 2,413,198 | Stewart | Dec. 24, 1946 |